July 15, 1930.  J. SNEED  1,770,816
BRAKE HOOK-UP
Filed Nov. 4, 1927  2 Sheets-Sheet 1

John Sneed, Inventor

July 15, 1930. J. SNEED 1,770,816
BRAKE HOOK-UP
Filed Nov. 4, 1927 2 Sheets-Sheet 2

John Sneed, Inventor

Patented July 15, 1930

1,770,816

UNITED STATES PATENT OFFICE

JOHN SNEED, OF DETROIT, MICHIGAN, ASSIGNOR TO THE MIDLAND STEEL PRODUCTS COMPANY, OF CLEVELAND, OHIO, A CORPORATION OF OHIO

BRAKE HOOK-UP

Application filed November 4, 1927. Serial No. 230,972.

This invention relates to brake linkage, particularly for use in motor vehicles and is related to the subject matter of my co-pending application, Serial No. 218,874 filed September 12th, 1927, and to my co-pending application filed herewith.

It is among the objects of my invention to provide a brake cross shaft in which torsional displacement between the point of application of torque and the points of delivery of torque will be equal when equal torques are delivered. Another object is to provide simple efficient means for lubricating the bearings which carry the shaft. A further object is to keep like parts of like sizes in the assembly. Another object is to rotate the shaft by imposing an unbalanced couple on the shaft so that no bending strain is put upon it. A further object is to connect the emergency brake operating lever and the service lever so that either or both of the levers will cause an unbalanced couple to be delivered to the cross shaft without bending it. A further object is to make the arrangement as simple and inexpensive as possible consistent with ample strength and ability to resist wear.

Further objects will appear from the following description of the apparatus used in carrying out my invention, a preferred form of which is illustrated in the accompanying drawings. The essential characteristics are summarized in the claims.

Figure 1:
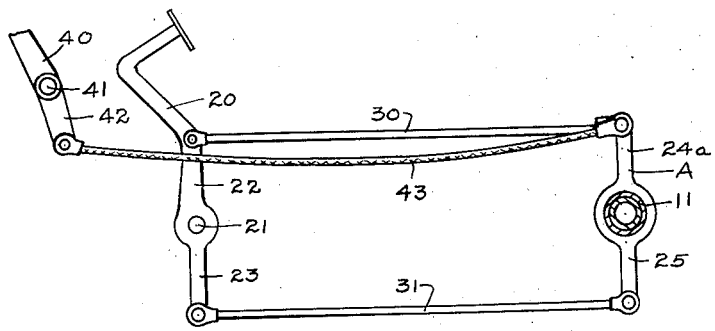
Figure 2:
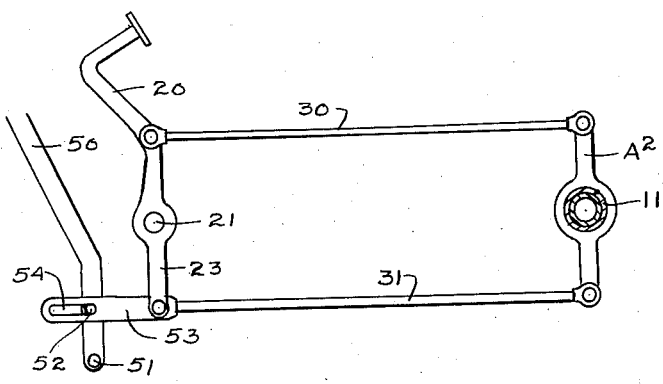
Figure 3:
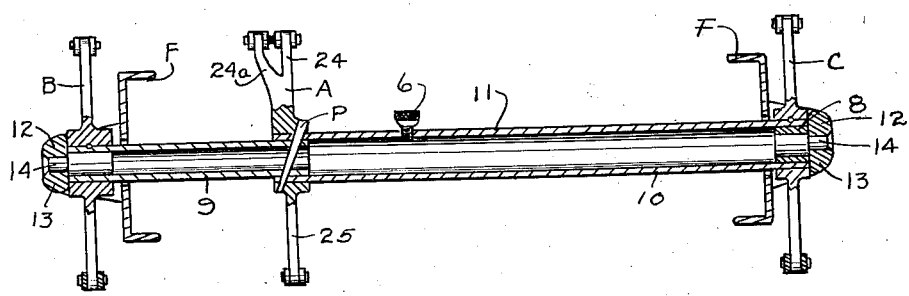
Figure 5:
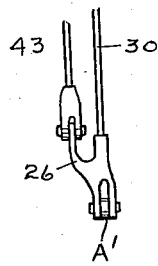
Figure 4:
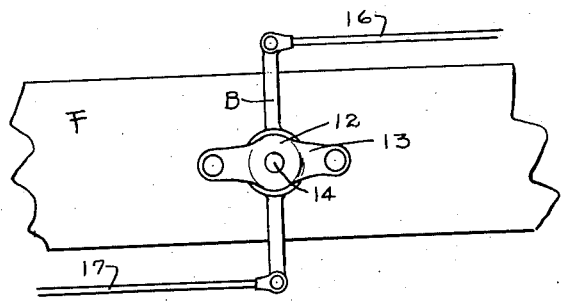
Figure 6:
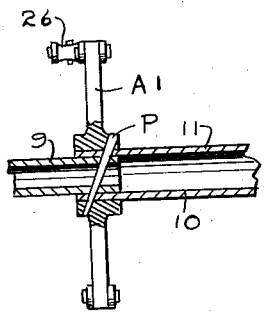
Figure 7:
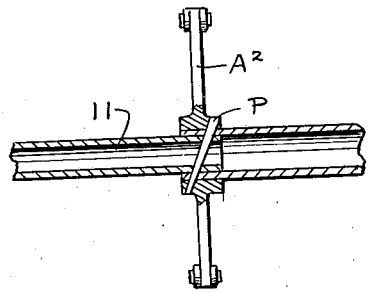
Figure 8:
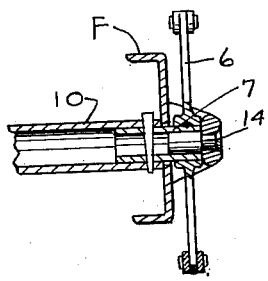

In the drawings, Fig. 1 is an elevation of the connections between the brake operating levers and cross shaft; Fig. 2 is a modification of the connection shown in Fig. 1; Fig. 3 is a longitudinal section of a cross shaft shown in relation to the vehicle side frame members and the shaft actuating arms or levers; Fig. 4 is an elevation of the outside of the left side frame member showing connections to the brake pull rods; Figs. 5 and 6 illustrate a modification of the shaft actuating lever and connections disclosed in Fig. 3; Fig. 7 is a longitudinal section of the shaft and shaft actuating lever shown in Fig. 2; and Fig. 8 is a modified form of the shaft bearing arrangement shown in Fig. 3.

Referring particularly to Figs. 1 and 3, I show a cross shaft 11 preferably made of two parts, 9 and 10. The ends of the shaft 11 are carried by bearings 12 which are mounted on side frame members F (see also Fig. 4). Secured to opposite ends of the shaft 11 are levers B and C. These levers comprise oppositely extending arms to which are secured brake pull rods 16 and 17 respectively. The pull rods connected to the lever B, engage the fore and aft brakes respectively on the left side of the vehicle. Similar pull rods connected to the lever C are connected to the fore and aft brakes on the right side of the vehicle. Secured to the shaft at the point of junction between the parts 9 and 10, I mount a lever A comprising oppositely extending arms 24 and 25 and a branch arm 24ª. Referring particularly to Fig. 1, I show a service lever or pedal 20 freely mounted on a shaft 21, which in common practice is the clutch operating shaft of the motor vehicle. The lever 20 has oppositely extending portions 22 and 23 which constitute arms complementary to the arms 24 and 25 of the lever A, and which may preferably be of the same length. Connecting the aforementioned arms are links 30 and 31. These links are adapted to carry loads both in tension and in compression. Preferably the links extend parallel to each other so that with the aforementioned arms, they constitute a parallelogram, and maintain a parallelogram when moved. I also show an emergency brake operating lever 40 pivoted about a shaft 41 having an extending portion 42 to the end of which is connected a cable 43. The other end of the cable is connected to the end of the arms 24ª shown in Fig. 3.

In operation, when the pedal lever 20 is depressed or moved in a counter-clockwise direction, the link 30 is put in tension and the link 31 in compression so that an unbalanced couple is delivered to the shaft 11 through the lever A. It will be seen that the shaft 11 is subjected to no bending or shearing stress in this operation. When the pedal lever 20 is depressed the arm 24ª of the lever A is moved forwardly so that the cable 43 is caused to sag but the lever 40 is not moved. It will be understood that a link having a slip connection (see Fig. 2) might be substituted for the cable 43. When the brakes are applied by the emergency lever 40, tension is exerted by the cable 43, which rotates the shaft 11. No bending or shearing strain is put upon the shaft 11 because the tension in the cable 43 puts both of the links 30 and 31 in compression, which transfers the horizontal or lateral load to the shaft 21, and in turn delivers an unbalanced couple to opposite ends of the lever A, thus causing the shaft 11 to rotate.

Referring particularly to Figs. 5 and 6, I show a modified form of the lever A designated A' wherein the upper arm is not forked but wherein a forked yoke 26 is connected to the upper end of the lever A', and is in turn connected to the cable 43 and the link 30. It will be seen that such connection results in the same action as that described above for the apparatus shown in Figs. 1 and 3.

Referring particularly to Fig. 2, I show a modification of the construction shown in Fig. 1, wherein the pedal 20 and links 30 and 31 are again shown. In place of the lever A I show the lever A², (see also Fig. 7) which is secured to the shaft 11 and is directly connected at its ends to the links 30 and 31. The operation of the brakes by the service lever 20 is similar to that described above, but the emergency lever connection constitutes a lever 50 freely pivoted on a shaft 51 as a fulcrum and carrying a pin 52. A link 53 having an elongated slot 54 engages the pin 52. The other end of the link 53 is directly pivotally connected to the end of the arm 23 at the point where the link 31 and the arm 23 are joined. To operate the brakes by the emergency lever 50, the lever is drawn in a clockwise direction about the point 51 thereby delivering a compressive stress to the link 53 and causing the lever 20 to rotate in a counter-clockwise direction, thus causing the link 30 to be put in tension and the link 31 in compression so that an unbalanced couple is delivered to the lever A² causing the shaft 11 to rotate without subjecting the shaft to bending or shearing stress. It will be noted that the levers 20 and 50 may be used jointly to supplement each other's action, but that the lever 20 may be used alone without moving the lever 50 by reason of the slip connection between the pin 52 and the link 53 with the slot 54.

Referring back to the structure of the cross shaft 11 and particularly to Figs. 3, 4 and 8, I mentioned above that the shaft 11 is preferably formed of two parts 9 and 10. It is common practice in motor vehicle construction to locate the brake pedal between the median plane of the vehicle and the left side frame member so that pedal effort is delivered to the cross shaft at a point not in the middle of the shaft. If the shaft be of uniform cross section and of uniform strength or stiffness throughout, the torsional deflection in the shaft will be greater for the longer part. I propose to build up a shaft wherein the unit in resistance to twisting i. e. stiffness of the shorter portion is proportioned to the length of that portion, and wherein the unit or stiffness of the longer portion is proportionately greater so that when torque is delivered at or near the juncture between the two portions, there will be equal gross overall torsional displacement in each portion. For example, the center to center distance between the levers A and B may be 7 inches and the distance between the levers A and C may be 28 inches. Then, according to my invention, I require that the part 10 of the shaft be substantially four times as stiff per unit of length as the part 9. I have found that if the part 9 were made of 1/2 inch solid round shafting that the part 10, being of the same material, should be a hollow shaft having a 1/2 inch internal diameter and substantially 83/100 inch external diameter. Thus the short part 9, while having but one-fourth unit strength of the part 10, has the same gross torsional strength as the part 10; i. e. the torsional deflection in the part 9 equals the torsional deflection in the part 10 when the parts are subjected to like torsional loads.

For the sake of lubricating the shaft bearings, I prefer to use hollow shafting of relative sizes which may be determined by well-known formulæ including the factor that the strength of the part 10 should be greater than the strength of the part 9 in the ratio of their respective working lengths. The parts 9 and 10 may preferably be hollow and may be joined together by suitable means such as a taper pin P. The ends of the shaft as mentioned above are carried in suitable bearings 12. The bearings may constitute brackets 13 mounted on the side frame members F and carrying pins 14 which extend into the ends of the hollow shaft. It may be found desirable to make the pins and brackets interchangeable and with that in view, I provide a bushing 8 to lie between the inner surface of the end of the part 10 and one of the pins 14.

Referring to Fig. 8, I show a modification wherein the part 10 terminates short of the side frame member F and a short pieces of shafting 7 similar to the shafting 9 may be rigidly secured thereto and carry the lever C and in turn engage the pin 14. In either event, the bearings may be lubricated by filling the shaft with suitable lubricant which may be supplied from a grease or oil cup 6.

Changes in structural details may appear to one skilled in the art without departing from the spirit of my invention, and while I have illustrated and described preferred forms thereof, I do not care to be limited thereto or in any manner other than by the claims appended hereto.

I claim:

1. The combination of a brake operating cross shaft comprising two portions of equal gross torsional stiffness and unequal length and having longitudinally aligned openings at least at opposite ends of the shaft, and bearing members extending into said openings.

2. The combination of a hollow brake operating cross shaft comprising two tubular portions, one fitting over the other and having an internal diameter equal to the external diameter of the first portion, bearing members extending into the ends of said shaft and being of diameter equal to the internal diameter of the smaller portion, and a member disposed within the end of the larger portion and engaging said bearing.

3. The combination of a hollow brake cross shaft, formed of two tubular portions of different size joined together, the larger portion fitting over the smaller portion at the point of juncture, bearings for the ends of said shaft including pins extending into the opposite ends of the shaft, said pins being of like diameter and one of them closely fitting the inside of the smaller of said portions, and a member having a cross section similar to the smaller of the shaft portions associated with the end of the shaft of greater size and engaging the other of said bearings.

4. The combination of a hollow brake cross shaft, formed of two tubular portions of different length and different diameter, the longer portion fitting over and secured to the smaller portion, bearings for the ends of said shaft including pins extending into opposite ends thereof, one of said pins closely fitting the inside of the smaller of said portions, and a spacing member having a cross section similar to the smaller of the shaft portions and associated with the end of the shaft of greater diameter and engaging the other of said bearings.

5. A hollow brake cross shaft adapted to be filled with lubricant comprising a relatively long portion and a relatively short portion joined together, the portions being of equal gross torsional stiffness, and bearing means extending into the ends of said shaft and retaining the lubricant therein.

6. The combination of a hollow brake operating cross shaft adapted to be filled with lubricant, comprising portons of different unit stiffness but of like overall stiffness and joined together at one point, means for delivering torque to said shaft at the said point of juncture, means for delivering torque from said shaft secured to opposite ends thereof, and means extending into the ends of said shaft for supporting it, said means retaining the lubricant in the shaft and being lubricated thereby.

7. The combination of a brake shaft comprising two portions joined together, said portions having equal gross torsional stiffness, bearings for the ends of said shaft, means for delivering an unbalanced couple to said shaft at the point of juncture of said portions, and means connected to the ends of said shaft adjacent said bearings for balancing said couple.

8. The combination of a hollow brake shaft, internal bearings for the ends of said shaft, means for delivering an unbalanced couple to said shaft at a point remote from its ends, and means connected to the ends of said shaft in the plane of said bearings for balancing said couple.

9. The combination of a hollow brake shaft, internal bearings for the ends of the shaft adapted to retain lubricant therein, a pair of brake actuating levers for rotating said shaft, and connections acting between said levers and said shaft whereby at least one of said levers is not moved when the shaft is rotated by the other lever.

10. The combination of a cross shaft comprising two parts of unequal length but of like gross torsional stiffness associated with each other, and a pair of independent levers connected to the shaft to rotate it, both said levers swingable in a plane normal to the shaft at the point of proximity between said portions.

11. The combination of a brake operating cross shaft comprising portions of unequal length joined together, said portions being of equal gross torsional stiffness, torque delivering levers secured to the ends of the shaft, at least a pair of manually operable levers, and connections between said shaft at the point of juncture of said portions and said levers for delivering torque to said shaft without imposing bending or shearing stress on said shaft.

12. The combination of a brake cross shaft having a lever with oppositely extending arms secured thereto, a fixed shaft, a lever pivotally mounted thereon with portions oppositely extending from said fixed shaft, a pair of links extending parallel with a line joining the centers of said shafts and connecting said levers, said links and levers forming a parallelogram throughout rotation of said shafts, said fixed pivot carrying the loads from the system directed parallel to said links and at least a pair of means for moving said lever, at least one of which means is movable independently of the other.

13. The combination of a rotatable brake shaft unsupported away from its ends, a pair of oppositely extending arms secured to the unsupported part of the shaft and together comprising one member of a parallelogram, a brake lever mounted on a fixed pivot and having oppositely extending portions parallel to said arms and comprising another member of the parallelogram, links joining said members and comprising the remaining members of the parallelogram, and at least a pair of means connected to at least one of said members for rotating said shaft.

14. The combination of a brake operating cross shaft, at least two manually operated brake actuating members, connections arranged as a parallelogram for rotating said shaft, a fixed connection between one of said members and said first named connections and a slip connection between the other of said members and said first named connections.

15. The combination of a cross shaft, and means for delivering an unbalanced couple to said shaft including a lever movable in one direction and including a second lever independent of said first lever and movable in an opposite direction.

16. The combination of a hand lever, a pedal, a cross shaft, and connections from said lever and said pedal to said shaft whereby oppositely directed forces at the points of application on said lever and said pedal deliver an unbalanced couple to said shaft.

17. The combination of a cross shaft, means engaging the shaft for rotating it including a pair of oppositely acting links, and a lever exclusive of said means for rotating the shaft connected to the end of one of said links.

18. The combination of a cross-shaft comprising two portions of unequal length joined together, said portions being equally deflectable under like torsional loads, a member having oppositely extending arms secured to said shaft at the point of juncture and a pair of links connected to opposite ends of said arms through which forces are delivered to rotate said shaft.

In testimony whereof, I hereunto affix my signature.

JOHN SNEED.